US012521925B2

(12) United States Patent
Galo, Jr.

(10) Patent No.: US 12,521,925 B2
(45) Date of Patent: Jan. 13, 2026

(54) MULTI-DIRECTIONAL CASTING NOZZLE (71) Applicant: PPG Industries Ohio, Inc., Cleveland, OH (US)

(72) Inventor: George A. Galo, Jr., Apollo, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 85 days.

(21) Appl. No.: 18/262,925

(22) PCT Filed: Jan. 25, 2022

(86) PCT No.: PCT/US2022/013617
§ 371 (c)(1),
(2) Date: Jul. 26, 2023

(87) PCT Pub. No.: WO2022/164770
PCT Pub. Date: Aug. 4, 2022

(65) Prior Publication Data
US 2024/0109231 A1    Apr. 4, 2024

Related U.S. Application Data

(60) Provisional application No. 63/141,498, filed on Jan. 26, 2021.

(51) Int. Cl.
*B29C 45/20*     (2006.01)
*B29B 7/04*      (2006.01)
(Continued)

(52) U.S. Cl.
CPC ............. *B29C 45/20* (2013.01); *B29C 45/03* (2013.01); *B29C 45/1775* (2013.01); *B29B 7/04* (2013.01); *B29L 2011/0016* (2013.01)

(58) Field of Classification Search
CPC .................................................. B29C 45/20
See application file for complete search history.

(56) References Cited

U.S. PATENT DOCUMENTS 2,116,935 A * 5/1938 Richard ................ B08B 9/0936
                                                   134/179
5,110,514 A    5/1992 Soane
                     (Continued)

FOREIGN PATENT DOCUMENTS

CN    202532062 U    11/2012
CN    105619692 A *  6/2016 ............. B29C 45/16
                     (Continued)

OTHER PUBLICATIONS

Machine translation CN202532062U (Year: 2012).*
(Continued)

*Primary Examiner* — Abbas Rashid
*Assistant Examiner* — Wayne K. Swier (57) ABSTRACT

An injection molding assembly configured for use with an injection molding machine includes a mixing chamber configured for receiving a flowable molding material and a nozzle assembly connectable to the mixing chamber. The nozzle assembly includes a cap removably connectable to the mixing chamber for enclosing the mixing chamber, and a nozzle extending through the cap and configured to deliver the flowable molding material from the mixing chamber to a mold. The nozzle is rotatable relative to the cap when the cap is connected to the mixing chamber. Also disclosed is an injection molding machine having a feeding device for feeding a flowable molding material, a mixing chamber configured for receiving the flowable molding material from the feeding device, and the nozzle assembly.

25 Claims, 5 Drawing Sheets

(51) Int. Cl.
B29C 45/03 (2006.01)
B29C 45/17 (2006.01)
B29L 11/00 (2006.01)

(56) References Cited

U.S. PATENT DOCUMENTS

| | | |
|---|---|---|
| 5,191,055 A | 3/1993 | Kanemura et al. |
| 5,837,797 A | 11/1998 | Okazak et al. |
| 6,416,689 B1 | 7/2002 | Keita et al. |
| 7,367,797 B2 | 5/2008 | Huard |
| 7,407,607 B2 | 8/2008 | Andino et al. |
| 7,687,597 B2 | 3/2010 | Bojkova |
| 2004/0021238 A1 | 2/2004 | Reed et al. |
| 2004/0262792 A1 | 12/2004 | Huard et al. |
| 2005/0269746 A1 | 12/2005 | Puniello et al. |
| 2011/0012277 A1 | 1/2011 | Lau et al. |
| 2012/0286435 A1 | 11/2012 | Bojkova et al. |
| 2013/0101955 A1 | 4/2013 | Broyles et al. |
| 2014/0076454 A1 | 3/2014 | Nar |
| 2017/0029144 A1 | 2/2017 | Kjar |
| 2017/0052284 A1 | 2/2017 | Bojkova |
| 2019/0210299 A1 | 7/2019 | Hayama et al. |

FOREIGN PATENT DOCUMENTS

| | | | | |
|---|---|---|---|---|
| CN | 206528560 U | | 9/2017 | |
| CN | 211838538 U | * | 11/2020 | |
| DE | 102008014902 B4 | | 12/2009 | |
| EP | 0312098 A2 | * | 4/1989 | ............ B29C 45/27 |
| EP | 0637491 A1 | | 2/1995 | |
| JP | H05172018 A | * | 7/1993 | |
| JP | H08309821 A | * | 11/1996 | ............ B29C 45/20 |
| TW | M520574 U | * | 4/2016 | |
| WO | 2014042827 A3 | | 3/2014 | |
| WO | WO-2018044869 A1 | * | 3/2018 | ............ B29C 67/00 |

OTHER PUBLICATIONS

Machine translation CN206528560U (Year: 2017).*
Machine translation JPH05172018A (Year: 1993).*
Machine translation JPH083090821A (Year: 1996).*
Machine translation TWM520574U (Year: 2016).*
Machine translation CN105619692A (Year: 2016).*
Machine translation CN211838538U (Year: 2020).*
International Search Report and Written Opinion received for PCT Application Serial No. PCT/US2022/013617 dated Apr. 12, 2022, 9 pages.

* cited by examiner

MULTI-DIRECTIONAL CASTING NOZZLE

CROSS-REFERENCE TO RELATED APPLICATION

This application claims priority to U.S. Provisional Patent Application No. 63/141,498, filed on Jan. 26, 2021, the disclosure of which is incorporated by reference herein in its entirety.

BACKGROUND OF THE DISCLOSURE

Field of the Disclosure

The present disclosure generally relates to an injection molding machine, and in particular, to an injection molding machine having a molding assembly with a multi-directional nozzle.

Description of the Related Art

Various manufacturing methods exist for making optical articles, such as optical or ophthalmic lenses. Some manufacturing methods are based on a molding process which allows for the manufacture of optical articles in large quantities. In such a molding process, a flowable forming material is delivered to one or more mold cavities that are shaped in the final desired shape of the optical article. Typically, optical articles are produced by a pair of mold halves that together define the mold cavity. The flowable forming material is delivered to the mold cavity using an injection molding machine and is then cured to form the lens. The mold halves are separated and the formed lens is extracted from the mold cavity. The formed lens may then be subjected to various post-molding steps, including inspection, cleaning, and the application of one or more coatings on a surface of the lens, such as a primer coating, a hard coating, a photochromic coating, and/or an antireflection coating.

The injection molding machine typically has at least one nozzle that is configured to deliver the flowable molding material to the mold. In some embodiments or aspects, the nozzle may face downward and is positioned above the mold such that the flowable molding material is delivered to the mold via gravity. In other embodiments or aspects, the nozzle faces upward and is integrated into a bottom wall of the mold such that the die is filled with the flowable molding material from the bottom. Some injection molding machines permit the use of nozzles in a downward orientation or an upward orientation.

Prior to delivering the flowable molding material to the mold, the nozzle of the injection molding machine may need to be purged to eliminate any air bubbles. Additionally, some nozzles may require calibration prior to use. Both of these procedures require the nozzle to be arranged in the downward orientation. In this manner, when the injection molding machine is to be set up for bottom filling the mold, the nozzle must first be positioned in the downward orientation for priming and calibration. The nozzle is subsequently removed from the injection molding machine and is rotated by 180° into the upward orientation. This procedure requires an additional step that increases the setup time for the injection molding machine. It would be desirable to develop new injection molding machines and nozzles that overcome this and other deficiencies of existing injection molding machines and nozzles.

SUMMARY OF THE DISCLOSURE

In accordance with some embodiments or aspects of the present disclosure, an injection molding assembly may be configured for use with an injection molding machine. The injection molding assembly may include a mixing chamber configured for receiving a flowable molding material, and a nozzle assembly connectable to the mixing chamber. The nozzle assembly may include a cap removably connectable to the mixing chamber for enclosing the mixing chamber, and a nozzle extending through the cap and configured to deliver the flowable molding material from the mixing chamber to a mold. The nozzle may be rotatable relative to the cap when the cap is connected to the mixing chamber.

In accordance with some embodiments or aspects of the present disclosure, the nozzle may be rotatable during delivery of the flowable molding material. For example, the nozzle may be rotatable 360° about a longitudinal axis of the mixing chamber.

In accordance with some embodiments or aspects of the present disclosure, the nozzle may have a first end at the cap, a second end terminating in a nozzle tip, and a bend between the first end and the second end. The bend may be a 90° bend. The first end of the nozzle may be flared such that an outer diameter of the first end is larger than an outer diameter of a remainder of the nozzle between the first end and the second end.

In accordance with some embodiments or aspects of the present disclosure, the nozzle assembly further may include a seal disposed between the cap and the mixing chamber. The seal may be configured to prevent a flow of the flowable molding material at an interface between the cap and the mixing chamber. The seal may be made from a plastic material, such as polytetrafluoroethylene.

In accordance with some embodiments or aspects of the present disclosure, the nozzle assembly further may include a clamp configured for fixing the cap on the mixing chamber. The clamp may be configured to removably connect to a locking element on the injection molding machine. The clamp may have a body having a first through hole for receiving at least a portion of the nozzle therethrough and at least one second through hole or notch configured for receiving the locking element on the injection molding machine. A first end of the at least one second through hole or notch may be configured to support a fastener removably connectable to the locking element on the injection molding machine.

In accordance with some embodiments or aspects of the present disclosure, the cap may be made from stainless steel. The nozzle may be made from stainless steel.

In accordance with some embodiments or aspects of the present disclosure, a nozzle assembly configured for connecting to a mixing chamber of an injection molding machine may include a cap configured for enclosing the mixing chamber, and a nozzle extending through the cap and configured to deliver a flowable molding material from the mixing chamber to a mold. The nozzle may be rotatable 360° relative to the cap when the cap is connected to the mixing chamber.

In accordance with some embodiments or aspects of the present disclosure, the nozzle may have a first flared end at the cap, a second end terminating in a nozzle tip, and a 90° bend between the first flared end and the second end. A seal may be disposed between the cap and the mixing chamber, wherein the seal is configured to prevent a flow of the flowable molding material at an interface between the cap and the mixing chamber. A clamp may be configured for fixing the cap on the mixing chamber, wherein the clamp is configured to removably connect to a locking element on the injection molding machine.

In accordance with some embodiments or aspects of the present disclosure, an injection molding machine may include a feeding device for feeding a flowable molding material, a mixing chamber configured for receiving the flowable molding material from the feeding device, and a nozzle assembly removably connectable to the mixing chamber. The nozzle assembly may include a cap configured for enclosing the mixing chamber and a nozzle extending through the cap and configured to deliver the flowable molding material from the mixing chamber to a mold. The nozzle may be rotatable 360° relative to the cap when the cap is connected to the mixing chamber.

In accordance with some embodiments or aspects of the present disclosure, the injection molding machine further may include a clamp configured for fixing the cap on the mixing chamber, wherein the clamp is removably connectable to a locking element on a frame of the injection molding machine. A seal may be disposed between the cap and the mixing chamber, wherein the seal is configured to prevent a flow of the flowable molding material at an interface between the cap and the mixing chamber.

The present disclosure further may be characterized by one or more of the following aspects:

In a first aspect, the present disclosure is directed to an injection molding assembly configured for use with an injection molding machine, the injection molding assembly comprising: a mixing chamber configured for receiving a flowable molding material; and a nozzle assembly connectable to the mixing chamber, the nozzle assembly comprising: a cap removably connectable to the mixing chamber for enclosing the mixing chamber; and a nozzle extending through the cap and configured to deliver the flowable molding material from the mixing chamber to a mold, wherein the nozzle is rotatable relative to the cap when the cap is connected to the mixing chamber.

In a second aspect, in the injection molding assembly in accordance with the first aspect the nozzle is rotatable during delivery of the flowable molding material.

In a third aspect, in the injection molding assembly in accordance the first aspect or the second aspect the nozzle is rotatable 360° about a longitudinal axis of the mixing chamber.

In a fourth aspect, in the injection molding assembly in accordance with any of the preceding first to third aspects the nozzle has a first end at the cap, a second end terminating in a nozzle tip, and a bend between the first end and the second end.

In a fifth aspect, in the injection molding assembly in accordance with the fourth aspect the bend is a 90° bend.

In a sixth aspect, in the injection molding assembly in accordance with the fourth aspect or the fifth aspect the first end of the nozzle is flared such that an outer diameter of the first end is larger than an outer diameter of a remainder of the nozzle between the first end and the second end.

In a seventh aspect, in the injection molding assembly in accordance with any of the preceding first to sixth aspects, the nozzle assembly further comprises a seal disposed between the cap and the mixing chamber, and the seal is configured to prevent a flow of the flowable molding material at an interface between the cap and the mixing chamber.

In an eighth aspect, in the injection molding assembly in accordance with the seventh aspect the seal is made from a plastic material.

In a ninth aspect, in the injection molding assembly in accordance with the eighth aspect the plastic material is polytetrafluoroethylene.

In a tenth aspect, in the injection molding assembly in accordance with any of the preceding first to ninth aspects the nozzle assembly further comprises a clamp configured for fixing the cap on the mixing chamber, and the clamp is configured to removably connect to a locking element on the injection molding machine.

In an eleventh aspect, in the injection molding assembly in accordance with the tenth aspect the clamp has a body having a first through hole for receiving at least a portion of the nozzle therethrough and at least one second through hole or notch configured for receiving the locking element on the injection molding machine, and a first end of the at least one second through hole or notch is configured to support a fastener removably connectable to the locking element on the injection molding machine.

In a twelfth aspect, in the injection molding assembly in accordance with any of the preceding first to eleventh aspects the cap is made from stainless steel.

In a thirteenth aspect, in the injection molding assembly in accordance with any of the preceding first to twelfth aspects the nozzle is made from stainless steel.

In a fourteenth aspect, the present disclosure is directed to a nozzle assembly configured for connecting to a mixing chamber of an injection molding machine, the nozzle assembly comprising: a cap configured for enclosing the mixing chamber; and a nozzle extending through the cap and configured to deliver a flowable molding material from the mixing chamber to a mold, wherein the nozzle is rotatable 360° relative to the cap when the cap is connected to the mixing chamber.

In a fifteenth aspect, in the nozzle assembly in accordance with the fourteenth aspect the nozzle has a first flared end at the cap, a second end terminating in a nozzle tip, and a 90° bend between the first flared end and the second end.

In a sixteenth aspect, the nozzle assembly in accordance with the fourteenth aspect or the fifteenth aspect further comprises a seal disposed between the cap and the mixing chamber, wherein the seal is configured to prevent a flow of the flowable molding material at an interface between the cap and the mixing chamber.

In a seventeenth aspect, the nozzle assembly in accordance with any of preceding fourteenth to sixteenth aspects further comprises a clamp configured for fixing the cap on the mixing chamber, wherein the clamp is configured to removably connect to a locking element on the injection molding machine.

In an eighteenth aspect, the present disclosure is directed to an injection molding machine comprising: a feeding device for feeding a flowable molding material; a mixing chamber configured for receiving the flowable molding material from the feeding device; and a nozzle assembly removably connectable to the mixing chamber, the nozzle assembly comprising: a cap configured for enclosing the mixing chamber; and a nozzle extending through the cap and configured to deliver the flowable molding material from the mixing chamber to a mold, wherein the nozzle is rotatable 360° relative to the cap when the cap is connected to the mixing chamber.

In a nineteenth aspect, the injection molding machine in accordance with the eighteenth aspect further comprises a clamp configured for fixing the cap on the mixing chamber, wherein the clamp is removably connectable to a locking element on a frame of the injection molding machine.

In a twentieth aspect, the injection molding machine in accordance with the eighteenth aspect or the nineteenth aspect further comprises a seal disposed between the cap and the mixing chamber, wherein the seal is configured to prevent a flow of the flowable molding material at an interface between the cap and the mixing chamber.

In a twenty first aspect, the present disclosure is directed to an injection molding machine comprising: a feeding device for feeding a flowable molding material; and the injection molding assembly according to any of the first aspect through the thirteenth aspect.

In a twenty second aspect, the present disclosure is directed to a method of making an optical article using the injection molding assembly according to any of the first aspect through the thirteenth aspect.

These and other features and characteristics of the multi-directional casting nozzle described herein, as well as the methods of manufacture and use thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only.

BRIEF DESCRIPTION OF THE DRAWINGS

In FIGS. 1-7 the same characters represent the same components unless otherwise indicated.

DETAILED DESCRIPTION

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

As used herein, "at least one of" is synonymous with "one or more of". For example, the phrase "at least one of A, B, or C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

As used herein, the term "optical" means pertaining to or associated with light and/or vision. For example, according to various non-limiting aspects disclosed herein, the optical article, article or device can be chosen from ophthalmic elements, articles, and devices, display elements, articles, and devices, windows, and mirrors.

As used herein, the term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

The term "flowable forming material" means a material suitable for use in forming an optical or ophthalmic article and having a viscosity of less than 70,000 cps, preferably less than 60,000 cps, more preferably less than 40,000 cps at a temperature of the material during a filling step of a mold. The temperature during the filling step may range from 75° C. to 155° C., typically between 90° C. to 120° C.

The discussion of various examples or aspects may describe certain features as being "particularly" or "preferably" within certain limitations (e.g., "preferably", "more preferably", or "even more preferably", within certain limitations). It is to be understood that the disclosure is not limited to these particular or preferred limitations but encompasses the entire scope of the various examples and aspects described herein.

The disclosure comprises, consists of, or consists essentially of, the following examples or aspects, in any combination. Various examples or aspects of the disclosure are illustrated in separate drawing figures. However, it is to be understood that this is simply for ease of illustration and discussion. In the practice of the disclosure, one or more examples or aspects shown in one drawing figure can be combined with one or more examples or aspects shown in one or more of the other drawing figures.

Figure 1:
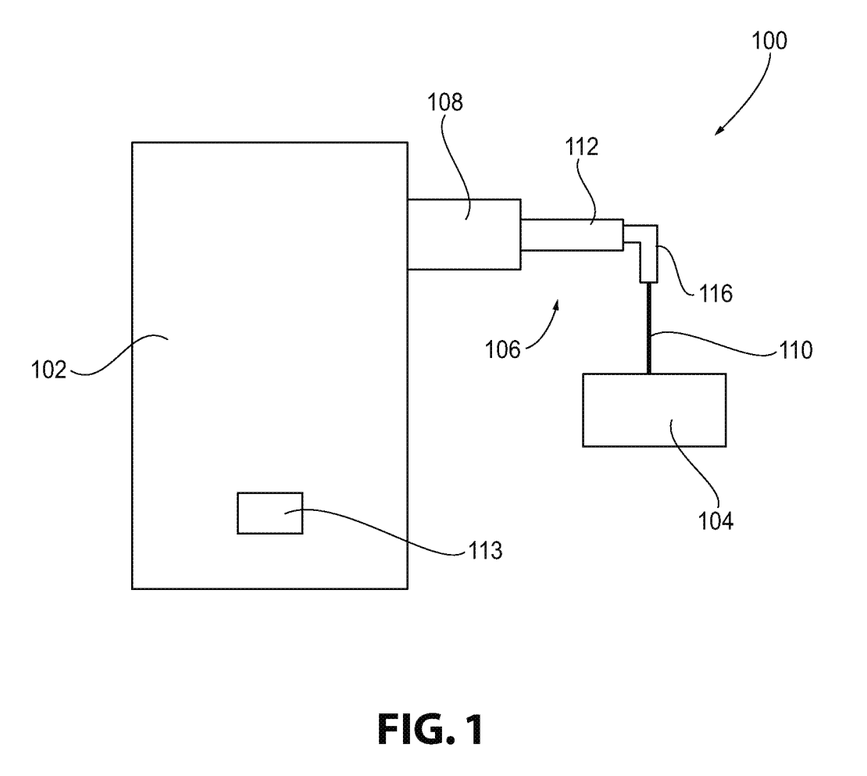
FIG. 1 is a representative schematic view of an injection molding machine in accordance with some embodiments or aspects of the present disclosure.

In various embodiments or aspects of the present disclosure, and with reference to FIG. 1, an injection molding system 100 may be configured for molding one or more substrates 10 useful for making optical articles. The injection molding system 100 generally includes an injection molding machine 102 configured to deliver a flowable molding material 110 to a mold 104. The injection molding machine 102 includes an injection molding assembly 106 having a mixing chamber 108 configured for receiving a quantity of flowable molding material 110. In some embodiments or aspects, the flowable molding material 110 may comprise two or more components that are delivered to and mixed in the mixing chamber 108. The injection molding assembly 106 further includes a nozzle assembly 112 in fluid communication with the mixing chamber 108 and configured for delivering the flowable molding material 110 from the mixing chamber 108 to the mold 104. The nozzle assembly 112 is formed separately from the mixing chamber 108 such that the mixing nozzle assembly 112 is not part of the mixing chamber 108. After the flowable molding material 110 that is delivered to the mold 104 cures, a finished substrate 10 is formed and can be removed from the mold 104.

In various embodiments or aspects of the present disclosure, the substrate 10 may be used to make one or more optical articles, such as ophthalmic articles or elements, display articles or elements, windows, mirrors, active liquid crystal cell articles or elements, and passive liquid crystal cell articles or elements.

Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intraocular lenses, magnifying lenses, and protective lenses or visors.

Examples of display articles, elements and devices include, but are not limited to, screens, monitors, and security elements, including without limitation, security marks and authentication marks.

Examples of windows include, but are not limited to, automotive and aircraft transparencies, filters, shutters, and optical switches.

The substrate 10 may be made from a polymeric material. The polymeric material is desirably flowable such that it can flow from a reactor vessel to a mold before polymerizing, e.g., curing, in the mold.

The substrate 10 is desirably made from a transparent material or a translucent material.

In some non-limiting embodiments or aspects disclosed herein, the flowable forming material 110 may be a reactive mixture comprising a polyisocyanate and/or a polyisothiocyanate, and a component comprising two or more active hydrogen groups selected from hydroxyl and thiol. In further embodiments or aspects, the flowable forming material 110 can be a sulfur containing urethane based polymeric material. Non-limiting examples of the sulfur containing urethane based polymeric material that can be used to form the substrate 10 comprise reaction products between compounds containing an active hydrogen atom, e.g. hydroxyl compounds, mercapto compounds and hydroxylated mercapto compounds with at least one isocyanate selected from the group consisting of polyisocyanate compounds, polyisothiocyanate compounds and isocyanate group containing polyisothiocyanate compounds.

Non-limiting examples of compounds containing an active hydrogen atom used to prepare the sulfur containing urethane based polymeric material for optical article as substrate 10 are described in U.S. Pat. No. 7,687,597 B2, column 5, line 1 to column 15, line 63; U.S. Patent Application Publication No. 2012/0286435A1, paragraphs [0047] to [0124]; U.S. Pat. No. 5,191,055, column 2, line 33 to line 50; and U.S. Pat. No. 5,837,797, column 13, line 15 to column 16, line 40.

Non-limiting examples of polyisocyanate used to prepare the sulfur containing urethane based polymeric material for optical article as substrate 10 are described in U.S. Patent Application Publication No. 2012/0286435A1, paragraphs [0138] to [0140]; and U.S. Patent Application Publication No. 2017/0052284A1, paragraphs [56] to [61].

With continued reference to FIG. 1, in some embodiments or aspects, the injection molding system 100 may include a controller 113 that is configured to control operation of one or more components of the injection molding machine 102, such as one or more components of the injection molding assembly 106. The controller 113 may be configured to transmit and/or receive data to and/or from one or more components of the injection molding machine 102. The controller 113 may perform one or more processes described herein. The controller 113 may perform these processes based on a processor executing software instructions stored by a computer-readable medium, such as a memory and/or a storage component. When executed, software instructions stored in the memory and/or the storage component may cause the processor to perform one or more processes described herein. Additionally or alternatively, hardwired circuitry may be used in place of or in combination with software instructions to perform one or more processes described herein.

The number and arrangement of components of the injection molding system 100 shown in FIG. 1 are provided as an example. There may be additional systems and/or devices, fewer systems and/or devices, different systems and/or devices, or differently arranged systems and/or devices than those shown in FIG. 1. One or more devices or components of the injection molding system 100 shown in FIG. 1 may perform one or more functions described as being performed by another device or component.

With reference to FIGS. 2A-4, the nozzle assembly 112 includes a cap 114 connected to the mixing chamber 108 to enclose the mixing chamber 108. In some embodiments or aspects, the cap 114 may be removably connectable to the mixing chamber 108. In this manner, the mixing chamber 108 may be cleaned and/or serviced when the cap 114 is removed. The nozzle assembly 112 further includes a clamp 128 configured for fixing the cap 114 on the mixing chamber 108. The clamp 128 may be configured to removably connect to a locking element 130 on the injection molding machine 102 (shown in FIGS. 2A-2B). In some embodiments or aspects, the cap 114, a nozzle 116, and the clamp 128 may be made from stainless steel.

With continued reference to FIGS. 2A-4, the nozzle 116 extends through the cap 114 and is configured to deliver the flowable molding material 110 from the mixing chamber 108 to the mold 104. The nozzle 116 may be freely rotatable relative to the cap 114 when the cap 114 is connected to the mixing chamber 108. In some embodiments or aspects, the nozzle may be rotatable between a first or upward position (FIG. 2A) configured for bottom filling the mold 104 (shown in FIG. 1), and a second, or downward position (FIG. 2B) configured for top filling the mold 104, such as by rotating the nozzle in a clockwise or a counterclockwise direction. The nozzle 116 may be rotatable relative to the cap 114 during delivery of the flowable molding material 110 from the mixing chamber 108 to the mold 104. In some embodiments or aspects, the nozzle 116 may be rotatable 360° about a longitudinal axis 118 of the mixing chamber 108. The nozzle 116 may be manually rotatable. In some embodiments or aspects, a rotation mechanism (not shown) may be provided to rotate the nozzle 116. The rotation mechanism may be controlled by the controller 113.

Figure 5:
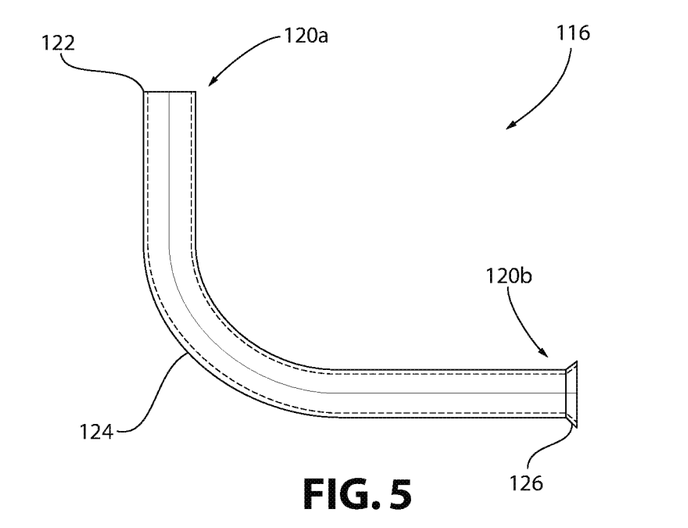
FIG. 5 is a cross-sectional view of a nozzle of the nozzle assembly shown in FIG. 3.

With reference to FIG. 5, the nozzle 116 is made as a hollow tube having a first end 120a configured for interfacing with the cap 114 and a second end 120b opposite the first end 120a. In some embodiments or aspects, the nozzle 116 may be made from stainless steel. The first end 120a of the nozzle 116 terminates at an open nozzle tip 122 through which the flowable molding material 110 may be dispensed into the mold 104. The nozzle 116 has a bend 124 between the first end 120a and the second end 120b. The bend 124 may be a 90° bend. The first end 120a of the nozzle 116 may have an outwardly extending flare 126 such that an outer diameter of the first end 120a at the flare 126 is larger than an outer diameter of a remainder of the nozzle 116 between the first end 120a and the second end 120b.

Figure 2A:
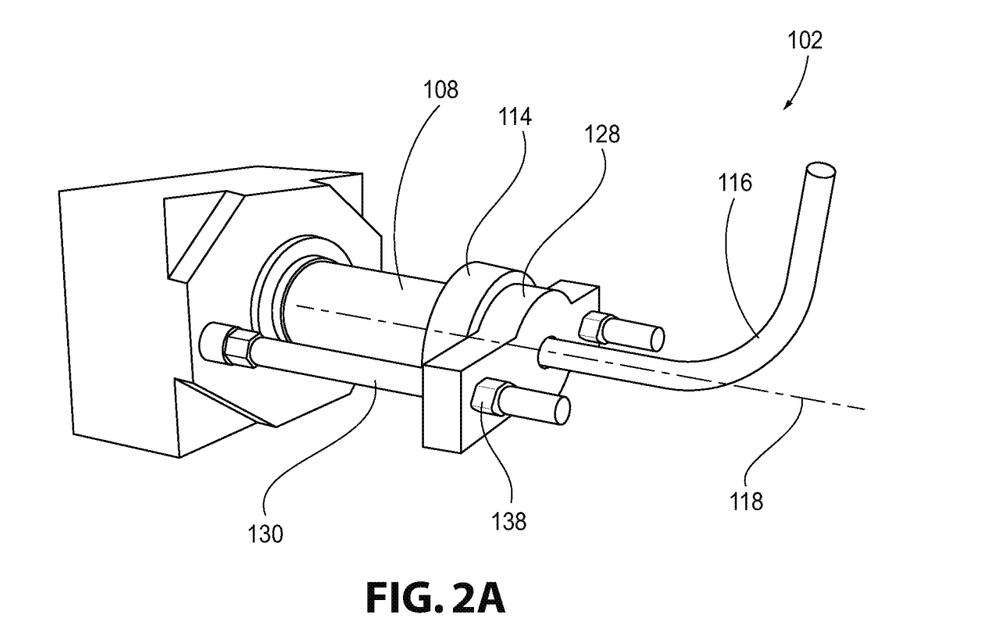
FIG. 2A is a representative perspective view of a nozzle assembly installed on an injection molding machine in accordance with some embodiments or aspects of the present disclosure, with the nozzle assembly shown in a first or upward orientation.
Figure 2B:
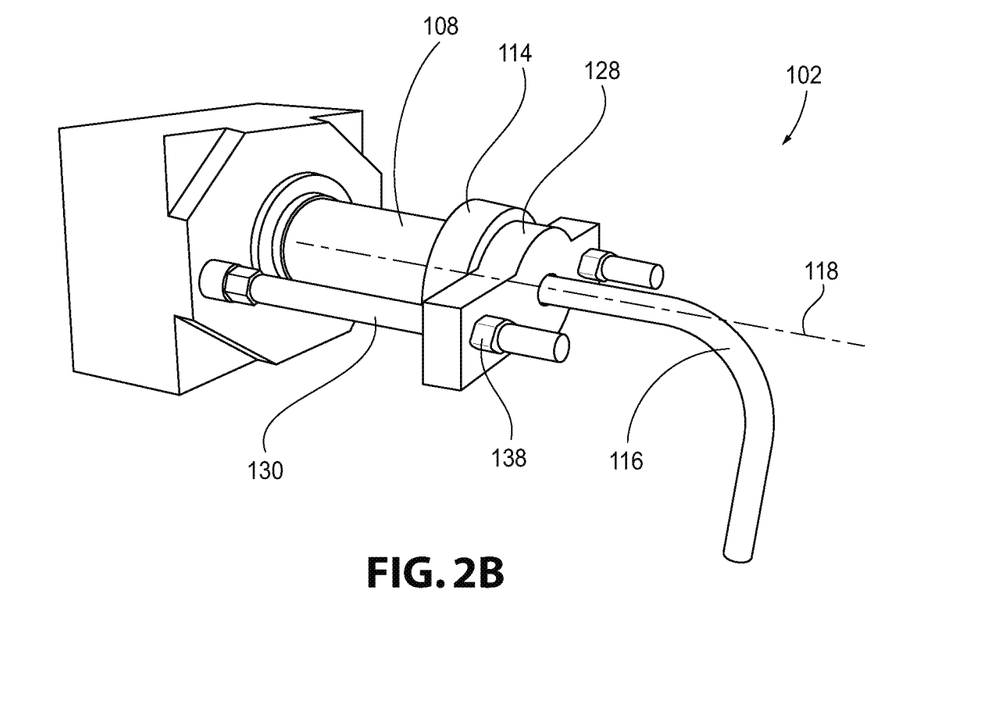
FIG. 2B is a representative perspective view of the nozzle assembly shown in FIG. 1, with the nozzle assembly shown in a second or downward orientation.
Figure 3:
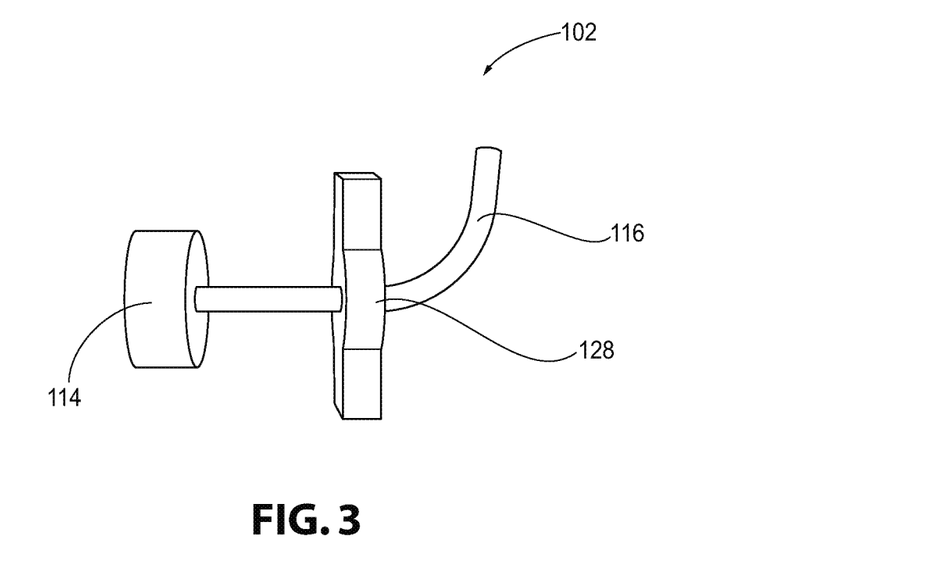
FIG. 3 is a perspective view of the nozzle assembly removed from the injection molding machine.
Figure 6:
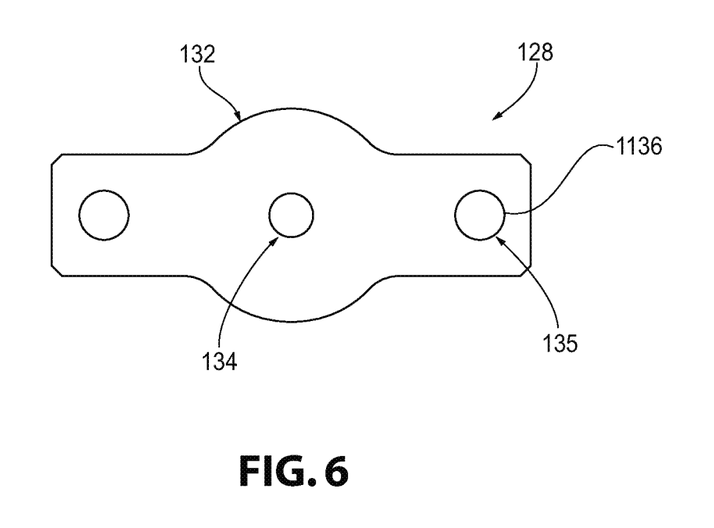
FIG. 6 is a cross-sectional view of a retaining collar of the nozzle assembly shown in FIG. 3.

With reference to FIG. 6, the clamp 128 has a body 132 having a first through hole 134 configured for receiving at least a portion of the nozzle 116 therethrough and at least one second through hole 135 or notch configured for receiving the locking element 130 on the injection molding machine 102 (shown in FIGS. 2A-2B). A first end 136 of the at least one second through hole 135 or notch is configured to support a fastener 138 (FIGS. 2A-2B) removably connectable to the locking element 130 on the injection molding machine 102.

Figure 4:
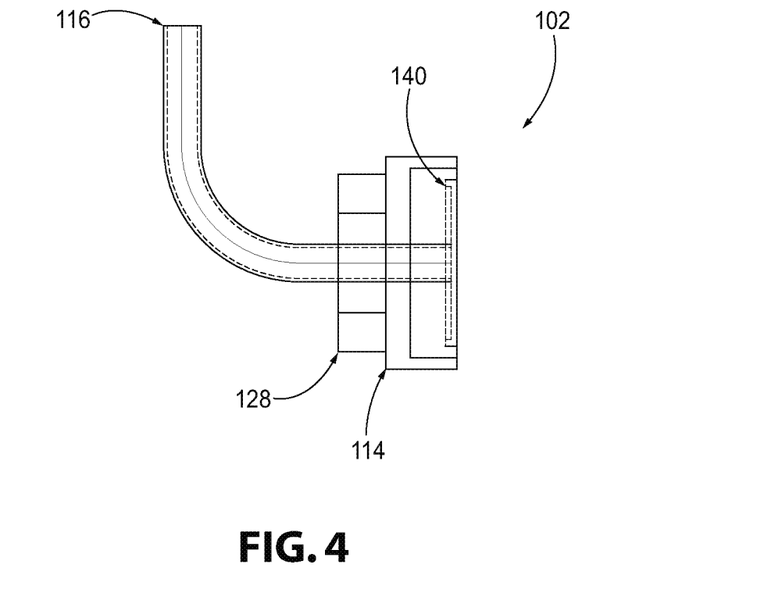
FIG. 4 is a cross-sectional view of the nozzle assembly shown in FIG. 2.
Figure 7:
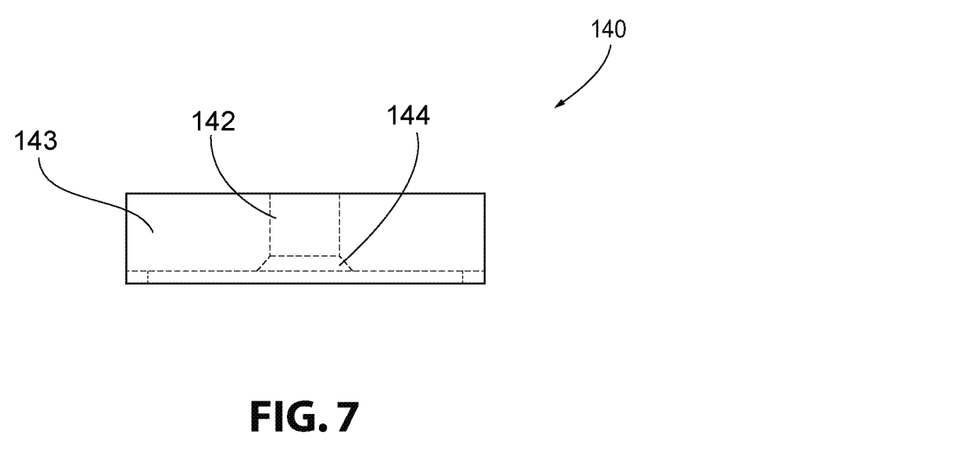
FIG. 7 is cross-sectional view of a seal of the nozzle assembly shown in FIG. 3.

With reference to FIGS. 4 and 7, the nozzle assembly 112 further comprises a seal 140 disposed between the cap 114 and the mixing chamber 108. In some embodiments or aspects, the seal 140 is configured to prevent a flow of the flowable molding material at an interface between the cap 114 and the mixing chamber 108. As shown in FIG. 7, the seal 140 includes a central opening 142 extending through a body 143 of the seal 140. The central opening 142 is configured to receive the nozzle 116 when the seal 140 is installed on the cap 114. The central opening 142 may have a tapered portion 144 configured for receiving the flare 126 of the nozzle 116 (shown in FIG. 6). In some embodiments or aspects, the seal 140 may be made from a plastic material, such as polytetrafluoroethylene.

The present disclosure has been described with reference to specific details of particular aspects thereof. It is not intended that such details be regarded as limitations upon the scope of the disclosure except insofar as and to the extent that they are included in the accompanying claims.

What is claimed is:

1. An injection molding assembly configured for use with an injection molding machine, the injection molding assembly comprising:
    a mixing chamber configured for receiving a flowable molding material; and
    a nozzle assembly connectable to the mixing chamber, the nozzle assembly comprising:
        a cap removably connectable to the mixing chamber for enclosing the mixing chamber; and
        a nozzle extending through the cap and configured to deliver the flowable molding material from the mixing chamber to a mold,
    wherein the nozzle is rotatable relative to the cap when the cap is connected to the mixing chamber.

2. The injection molding assembly of claim 1, wherein the nozzle is rotatable during delivery of the flowable molding material.

3. The injection molding assembly of claim 1, wherein the nozzle is rotatable 360° about a longitudinal axis of the mixing chamber.

4. The injection molding assembly of claim 1, wherein the nozzle has a first end at the cap, a second end terminating in a nozzle tip, and a bend between the first end and the second end.

5. The injection molding assembly of claim 4, wherein the bend is a 90° bend.

6. The injection molding assembly of claim 4, wherein the first end of the nozzle is flared such that an outer diameter of the first end is larger than an outer diameter of a remainder of the nozzle between the first end and the second end.

7. The injection molding assembly of claim 1, wherein the nozzle assembly further comprises a seal disposed between the cap and the mixing chamber, and wherein the seal is configured to prevent a flow of the flowable molding material at an interface between the cap and the mixing chamber.

8. The injection molding assembly of claim 7, wherein the seal is made from a plastic material.

9. The injection molding assembly of claim 8, wherein the plastic material is polytetrafluoroethylene.

10. The injection molding assembly of claim 1, wherein the nozzle assembly further comprises a clamp configured for fixing the cap on the mixing chamber, and wherein the clamp is configured to removably connect to a locking element on the injection molding machine.

11. The injection molding assembly of claim 10, wherein the clamp has a body having a first through hole for receiving at least a portion of the nozzle therethrough and at least one second through hole or notch configured for receiving the locking element on the injection molding machine, and wherein a first end of the at least one second through hole or notch is configured to support a fastener removably connectable to the locking element on the injection molding machine.

12. The injection molding assembly of claim 1, wherein the cap is made from stainless steel.

13. The injection molding assembly of claim 1, wherein the nozzle is made from stainless steel.

14. A nozzle assembly configured for connecting to a mixing chamber of an injection molding machine, the nozzle assembly comprising:
    a cap configured for enclosing the mixing chamber; and
    a nozzle extending through the cap and configured to deliver a flowable molding material from the mixing chamber to a mold,
    wherein the nozzle is rotatable 360° relative to the cap when the cap is connected to the mixing chamber.

15. The nozzle assembly of claim 14, wherein the nozzle has a first flared end at the cap, a second end terminating in a nozzle tip, and a 90° bend between the first flared end and the second end.

16. The nozzle assembly of claim 14, further comprising a seal disposed between the cap and the mixing chamber, wherein the seal is configured to prevent a flow of the flowable molding material at an interface between the cap and the mixing chamber.

17. The nozzle assembly of claim 14, further comprising a clamp configured for fixing the cap on the mixing chamber, wherein the clamp is configured to removably connect to a locking element on the injection molding machine.

18. An injection molding machine comprising:
a feeding device for feeding a flowable molding material;
a mixing chamber configured for receiving the flowable molding material from the feeding device; and
a nozzle assembly removably connectable to the mixing chamber, the nozzle assembly comprising:
a cap configured for enclosing the mixing chamber; and
a nozzle extending through the cap and configured to deliver the flowable molding material from the mixing chamber to a mold,
wherein the nozzle is rotatable 360° relative to the cap when the cap is connected to the mixing chamber.

19. The injection molding machine of claim 18, further comprising a clamp configured for fixing the cap on the mixing chamber, wherein the clamp is removably connectable to a locking element on a frame of the injection molding machine.

20. The injection molding machine of claim 18, further comprising a seal disposed between the cap and the mixing chamber, wherein the seal is configured to prevent a flow of the flowable molding material at an interface between the cap and the mixing chamber.

21. The nozzle assembly of claim 15, wherein the flared end of the nozzle comprises an outwardly-extending surface, and wherein the outwardly-extending surface forms a non-perpendicular angle with a longitudinal axis of the mixing chamber.

22. The nozzle assembly of claim 21, further comprising a seal disposed between the cap and the mixing chamber, wherein the seal is in fluid communication with the mixing chamber, wherein the seal comprises an opening extending through a body of the seal and the nozzle extends through the opening in the seal, and wherein the opening in the seal comprises a tapered portion engaging the flared end of the nozzle.

23. The injection molding assembly of claim 1, wherein the cap comprises:
a first side connectable to the mixing chamber;
a second side opposite the first side; and
an opening extending through the cap from the first side to the second side; and
wherein the nozzle extends through the opening through the cap from the first side to the second side.

24. The nozzle assembly of claim 14, wherein the cap comprises:
a first side connectable to the mixing chamber;
a second side opposite the first side; and
an opening extending through the cap from the first side to the second side; and
wherein the nozzle extends through the opening through the cap from the first side to the second side.

25. The injection molding machine of claim 18, wherein the cap comprises:
a first side connectable to the mixing chamber;
a second side opposite the first side; and
an opening extending through the cap from the first side to the second side; and
wherein the nozzle extends through the opening through the cap from the first side to the second side.

* * * * *